Aug. 31, 1926.
C. J. DUNZWEILER
STORAGE BATTERY
Filed Oct. 6, 1924
1,598,123
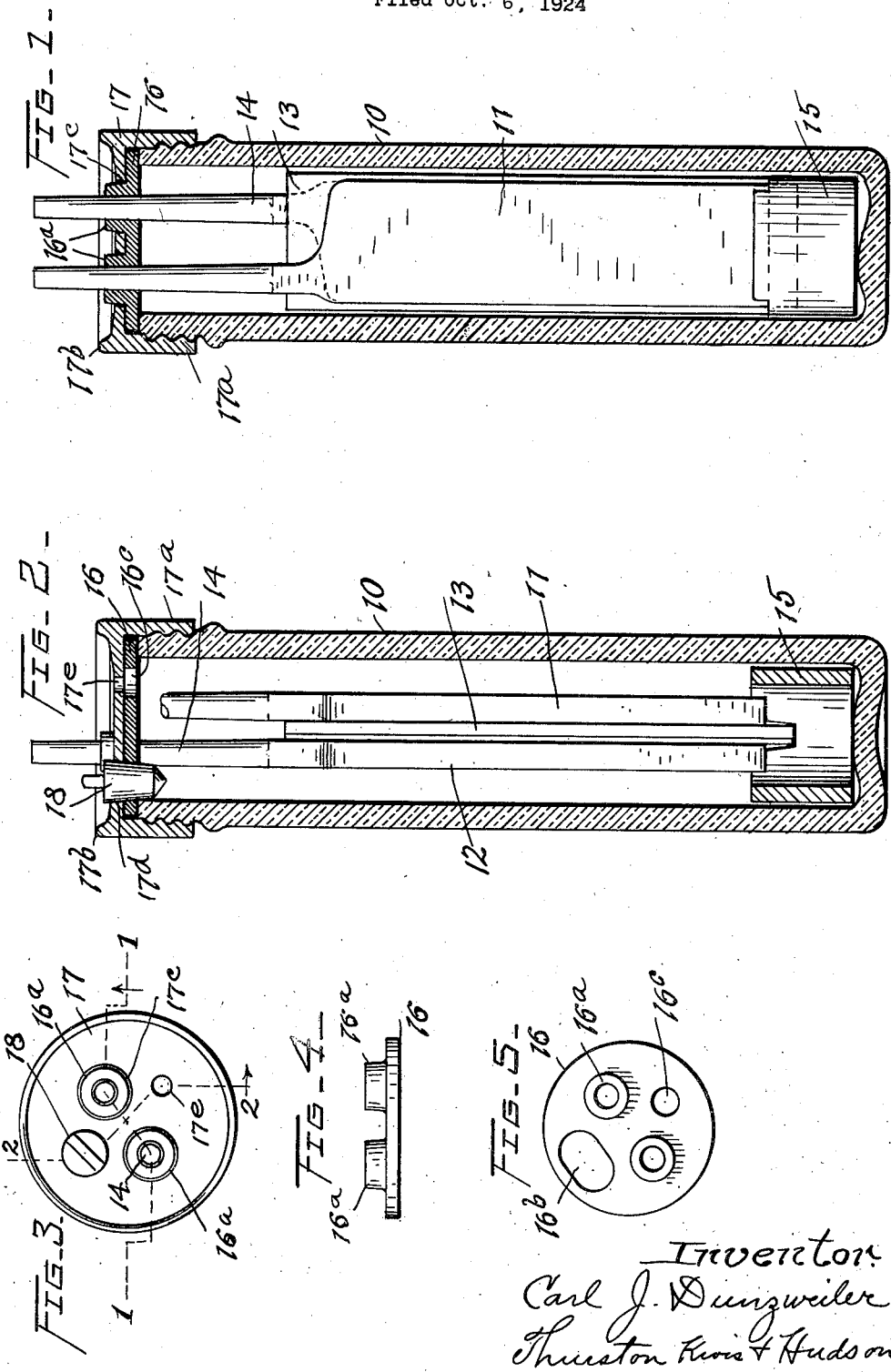

Patented Aug. 31, 1926.

1,598,123

UNITED STATES PATENT OFFICE.

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

Application filed October 6, 1924. Serial No. 741,867.

This invention relates to storage batteries, and particularly to batteries adapted for radio service. The present invention is an improvement on the battery constituting the subject matter of U. S. Patent No. 1,506,874, granted September 2, 1924, the object of the invention being to simplify the construction by reducing the number of parts and to reduce the cost of manufacturing and assembly.

The invention may be briefly summarized as consisting in certain novel details of construction, and combinations and arrangements of parts which will be described in the specification and set forth in the appended claims.

In the accompanying sheet of drawings wherein I have illustrated the preferred form of the invention, Fig. 1 is a vertical sectional view substantially along the irregular line 1—1 of Fig. 3, looking in the direction indicated by the arrows; Fig. 2 is a similar sectional view substantially along the irregular line 2—2 of Fig. 3, looking in the direction indicated by the arrows; Fig. 3 is a top plan view; Fig. 4 is an edge view; and Fig. 5 is a top plan view of the soft rubber inner cover member.

In the drawing I have shown simply a one-cell battery, but usually a number of cells will be grouped together and connected in series in the usual manner. The constructiion herein illustrated, in so far as the body of the container and plates are concerned, is similar to that illustrated in the patent referred to above, that is to say, the battery includes a container 10, which is preferably cylindrical in shape, and preferably, though not necessarily, formed of glass, the container having a threaded top portion to accommodate the cover to be referred to presently.

While the battery may have more than two positive and negative plates, in this instance, as in the prior patent, two plates 11 and 12 of opposite polarity are shown, these plates being spaced apart by an insulator or separator 13, and being provided with terminals or posts 14 which project up through the cover. The same type of bottom rest 15 is shown as in the prior patent, this bottom rest being in this instance, though not necessarily, cylindrical in shape, and being notched out to receive the lower ends of the plates so as to hold them together at the bottom, the middle of the notch being somewhat deeper than the remainder to accommodate the lower end of the separator and permit it to project down below the plates.

In this instance, the cover in which my improvements reside is composed of two parts 16 and 17. The former consists of a disk-like member of insulating material, preferably soft rubber, which extends across and rests upon the top edge of the container 10. It is provided with two upwardly projecting bosses 16ª of the same material as the remainder of this part, and through these bosses the terminals of the plates project, being tightly fitted therein so that the posts or terminals are tightly sealed against leakage. This disk 16 is pressed down over the terminals and in so doing the terminals are forced through the bosses, and when the parts are in their final positions the outer edge of the disk will rest on the top of the container at the same time that the lower ends of the plates rest on the bottom rest.

The cover member 17 is formed of relatively hard material, preferably hard rubber, and is provided with a down-turned internally threaded flange 17ª which is screwed onto the threaded top portion of the container, and with a peripheral upstanding acid retaining flange 17ᵇ. It is provided with two openings 17ᶜ of a size to receive the bosses 16ª of the inner cover member, and when the cover is screwed tight, with the edge portion of the inner cover member squeezed down against the top of the container, the upper ends of the bosses preferably protrude slightly above the cover member 17 and fill the openings. Thus it will be seen that the inner cover member combines in one piece a gasket to form a tight seal between the outer or main cover member and the container, and a seal for the terminal posts, so as to prevent leakage of acid between the top of the container and the cover, and along the posts.

The upper cover member has a filling opening 17ᵈ which is normally closed by a plug 18, which is removed when acid is to be supplied, this plug being preferably formed of rubber, and it is provided also with a second opening 17ᵉ which is relatively small, and serves as a vent opening. The inner cover member is preferably provided with openings 16ᵇ and 16ᶜ which align with the openings 17ᵈ and 17ᵉ of the upper cover member when the parts are in their final positions as shown in the drawing.

By the improvements above explained, the advantages or objects enumerated at the beginning of the specification are attained in a very effective manner.

Having described my invention, I claim:

1. A storage battery comprising a container having a screw top and containing positive and negative plates having upstanding terminals or posts, a cover composed of a relatively soft member having integral bosses through which the terminals extend and in which they are tightly fitted to form a seal, and a relatively hard member adapted to be screwed onto the top of the container and serving to clamp the relatively soft member onto the container.

2. A storage battery comprising a container having a threaded top portion and receiving positive and negative plates with upstanding terminals, a cover comprising a combined terminal and container seal having integral upstanding bosses through which the terminals extend and are tightly fitted to form a seal, and a clamping member adapted to be screwed onto the container, said member being recessed to receive the bosses and serving to clamp the edge portion of the other member against the top of the container.

3. A storage battery comprising a container having a screw top and containing positive and negative plates with upstanding terminals, a cover for the container comprising an inner soft insulating member engaging the top of the container and having integral bosses in which the terminals are tightly fitted so as to form a seal, and an outer hard member adapted to be screwed onto the container against the inner member and having openings into which the bosses extend.

4. A storage battery comprising a container receiving positive and negative plates having upstanding terminals, and a cover for the container composed of an inner soft member and an outer hard member which clamps the former to the top of the container, the terminals extending through both cover members and being tightly sealed in the inner member, the two cover members having normally open vent openings and having normally closed aligned filling openings which are displaced from and independent of the vent openings.

5. A storage battery comprising a container having a threaded top portion, a cover comprising an inner member of relatively soft rubber and an outer member of relatively hard rubber which is adapted to clamp the inner member onto the top of the container, the inner member having integral bosses and the outer member having openings which receive the bosses, positive and negative plates within the container having terminals extending through the bosses and tightly fitted therein, and the cover member having aligned filling openings extending through both members thereof.

In testimony whereof, I hereunto affix my signature.

CARL J. DUNZWEILER.